Figure 1:
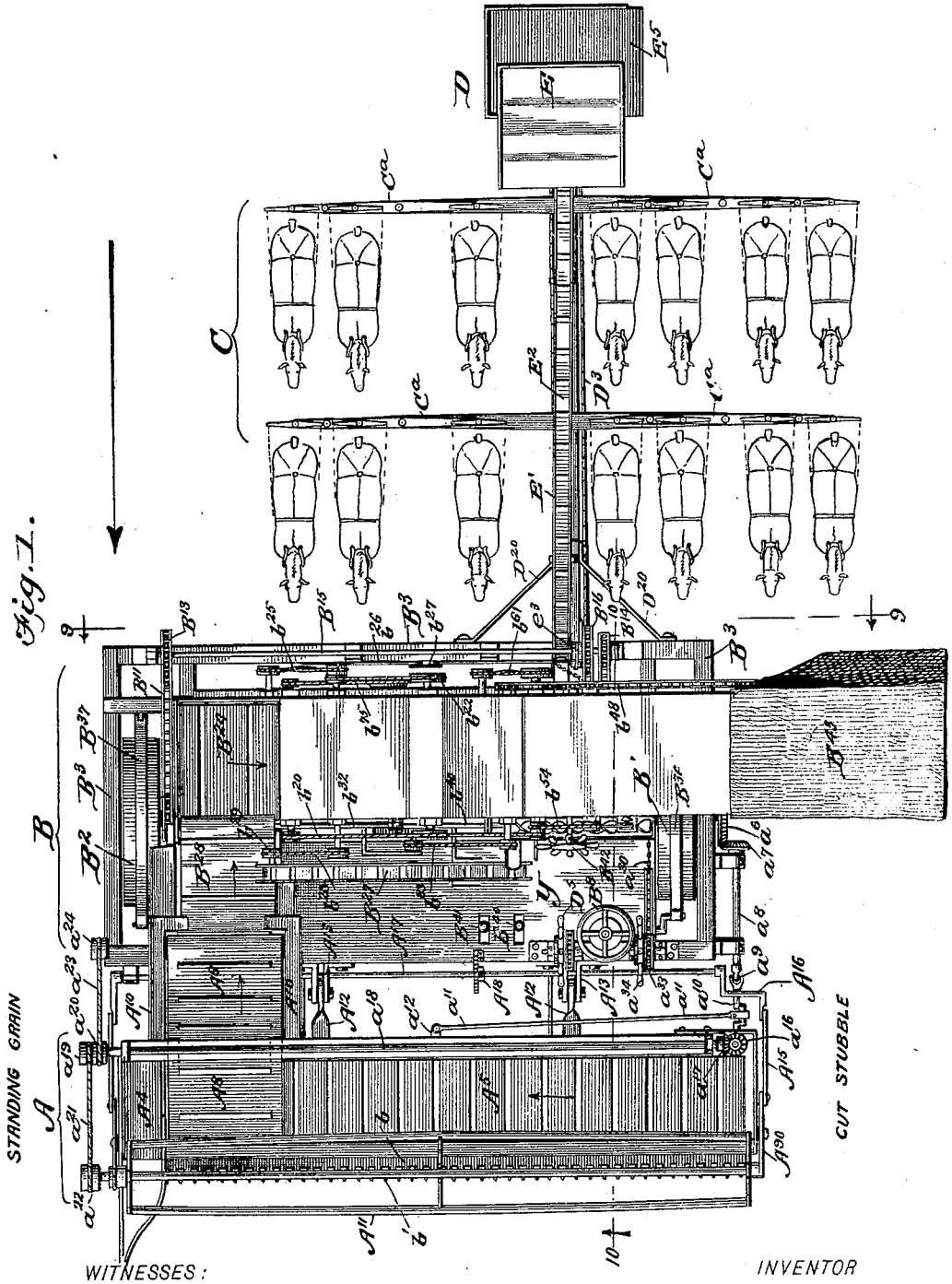

No. 640,682. Patented Jan. 2, 1900.
T. P. MORAN.
COMBINED HARVESTER, THRESHER, AND BAGGER.
(Application filed Mar. 27, 1899.)

(No Model.) 14 Sheets—Sheet 1.

WITNESSES:

INVENTOR
Thomas P. Moran.
BY
ATTORNEYS.

No. 640,682. Patented Jan. 2, 1900.
T. P. MORAN.
COMBINED HARVESTER, THRESHER, AND BAGGER.
(Application filed Mar. 27, 1899.)
(No Model.) 14 Sheets—Sheet 3.

WITNESSES:
M. D. Blondell
Edw. W. Byrn.

INVENTOR
Thomas P. Moran
BY Munn & Co.
ATTORNEYS.

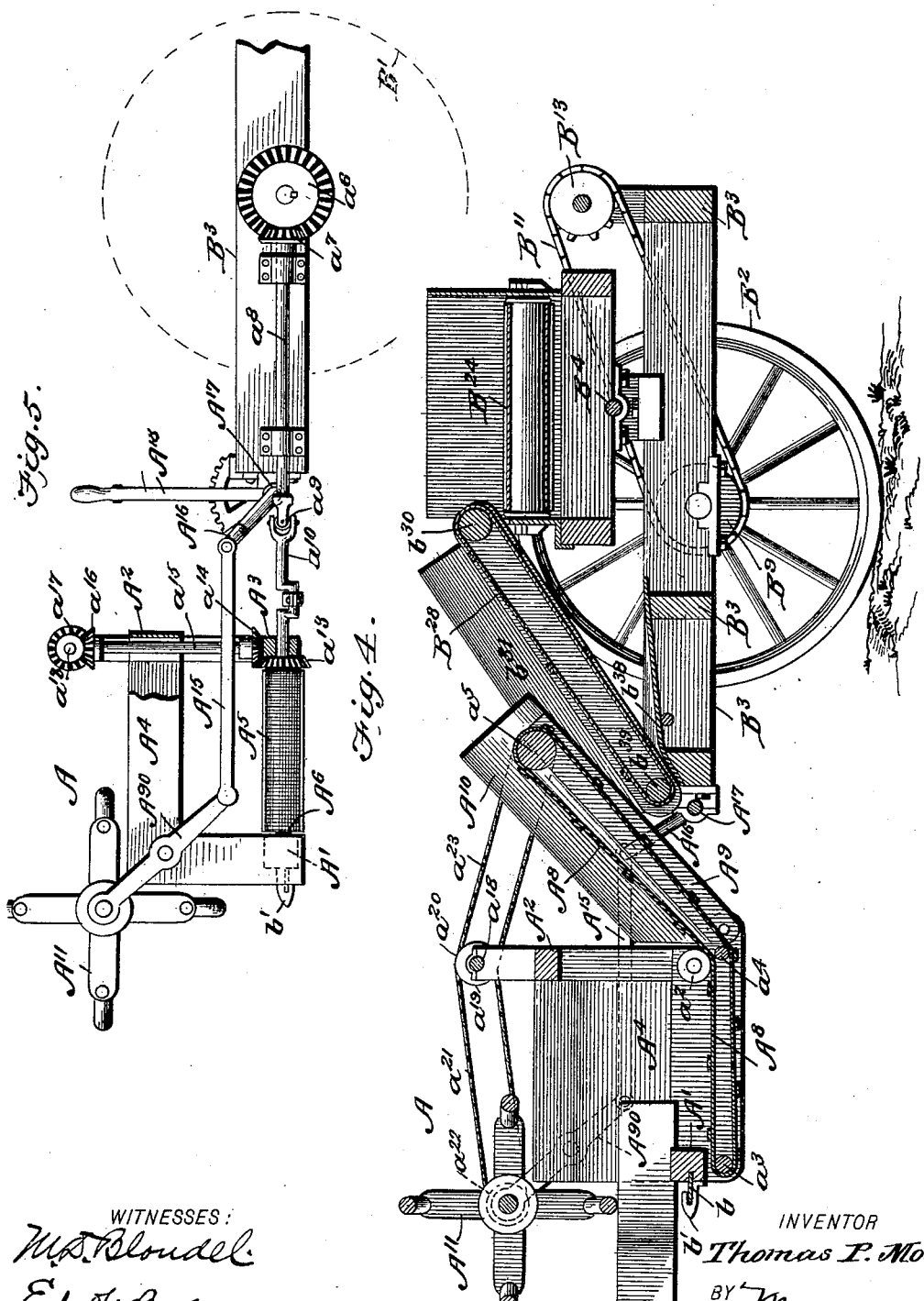

No. 640,682. Patented Jan. 2, 1900.
T. P. MORAN.
COMBINED HARVESTER, THRESHER, AND BAGGER.
(Application filed Mar. 27, 1899.)
(No Model.) 14 Sheets—Sheet 5.

WITNESSES:
M. D. Bloudel
Edw. W. Byrn.

INVENTOR
Thomas P. Moran,
BY Munn & Co.
ATTORNEYS.

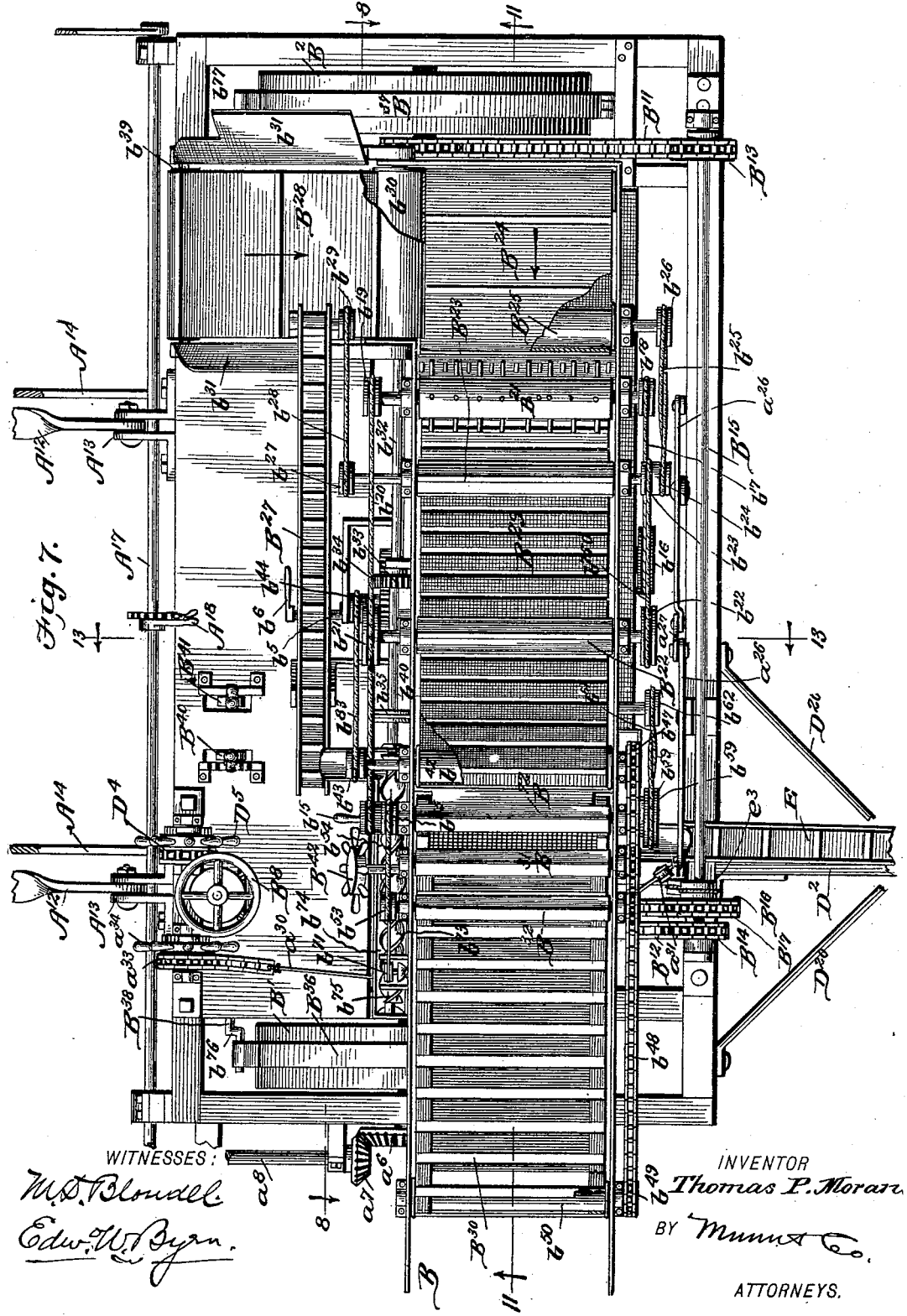

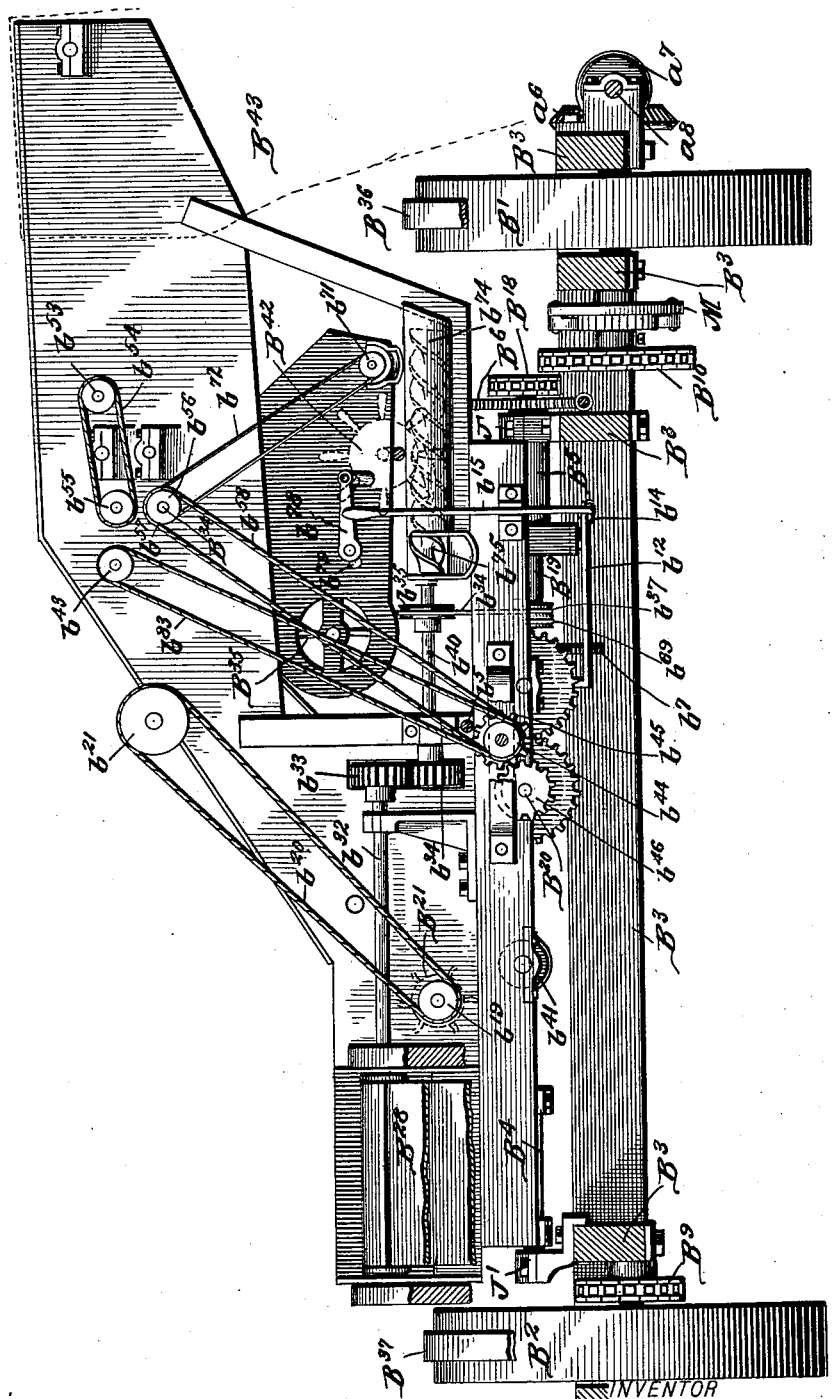

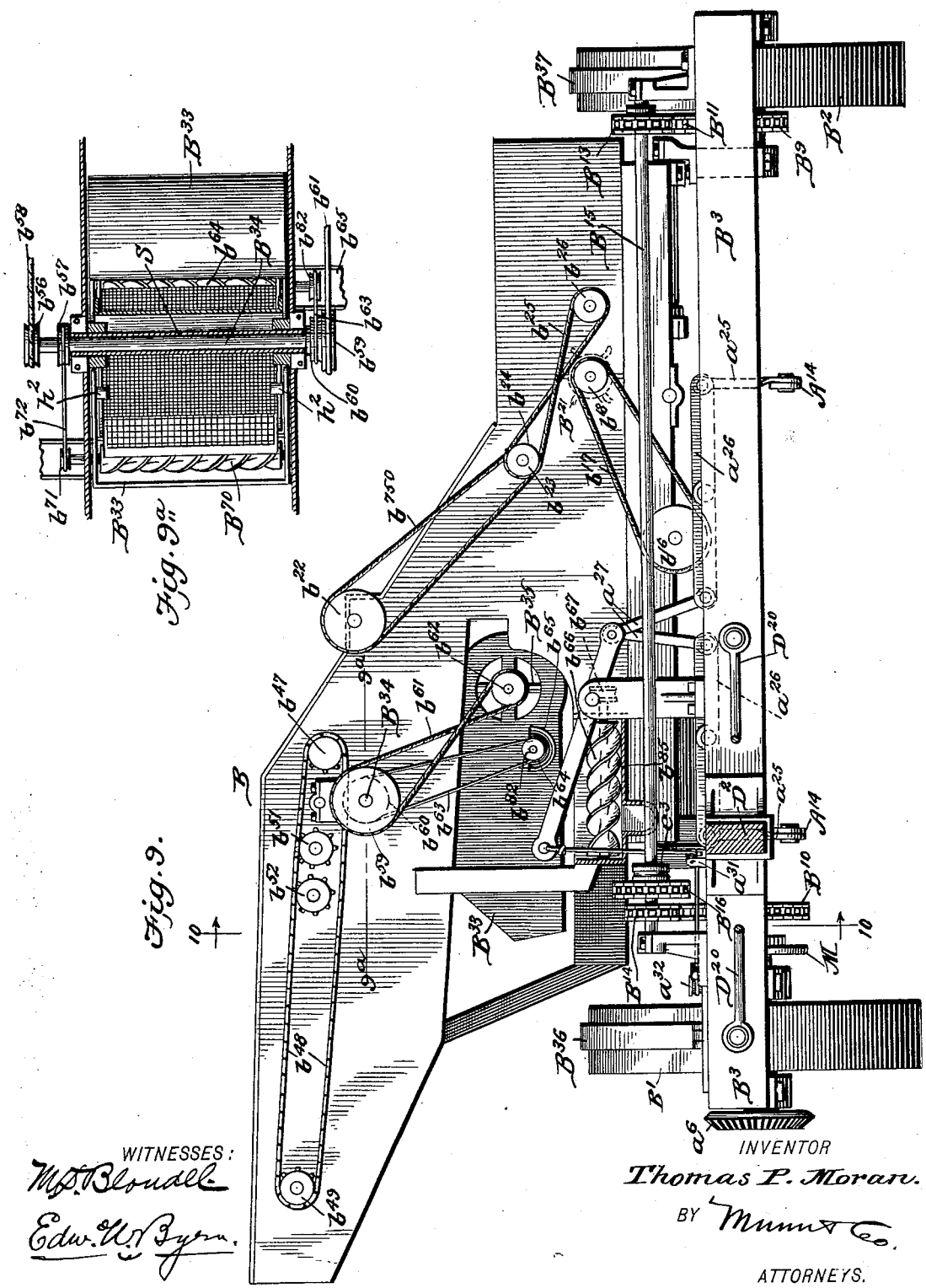

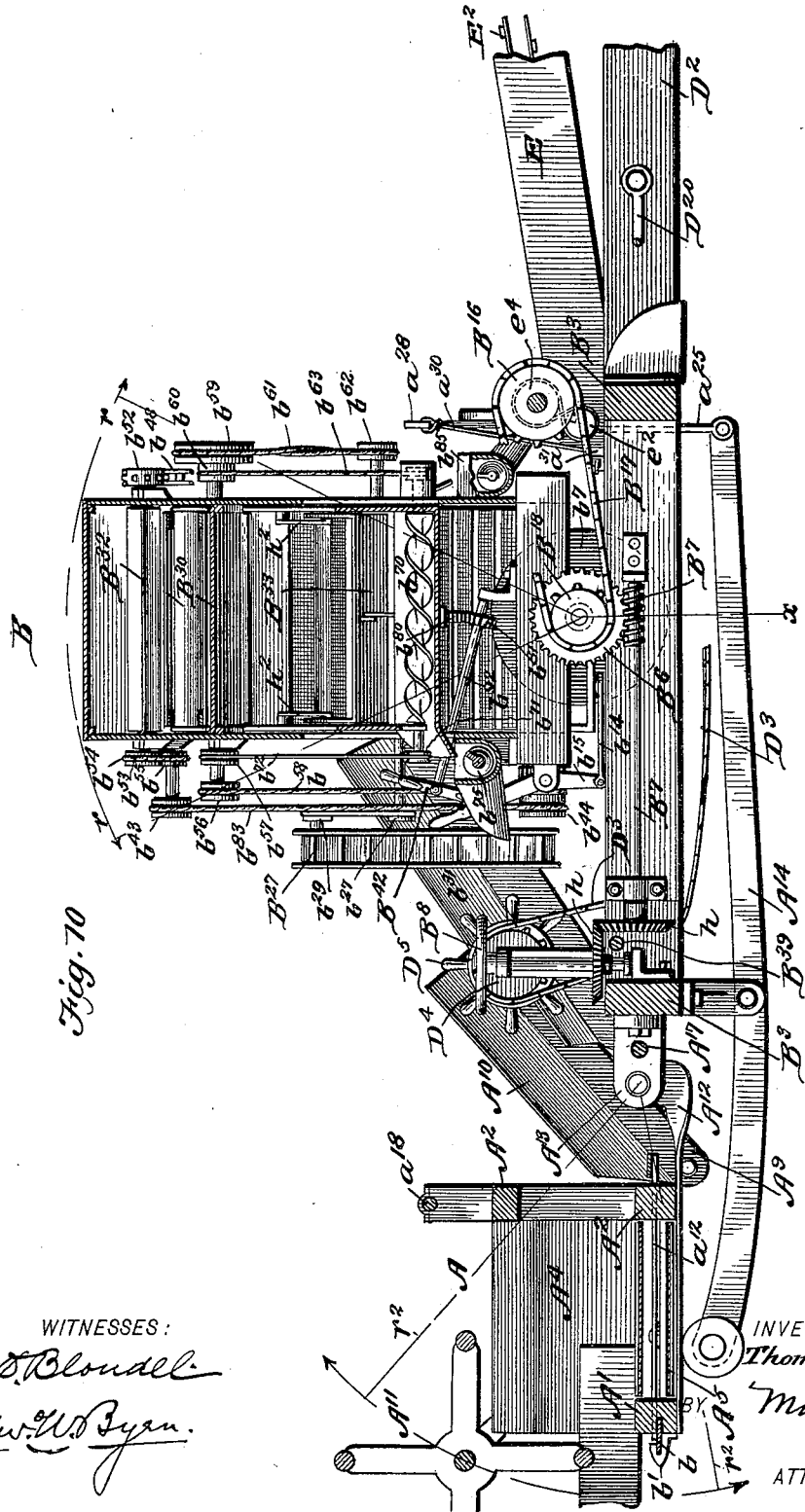

No. 640,682. Patented Jan. 2, 1900.
T. P. MORAN.
COMBINED HARVESTER, THRESHER, AND BAGGER.
(Application filed Mar. 27, 1899.)
(No Model.) 14 Sheets—Sheet 10.
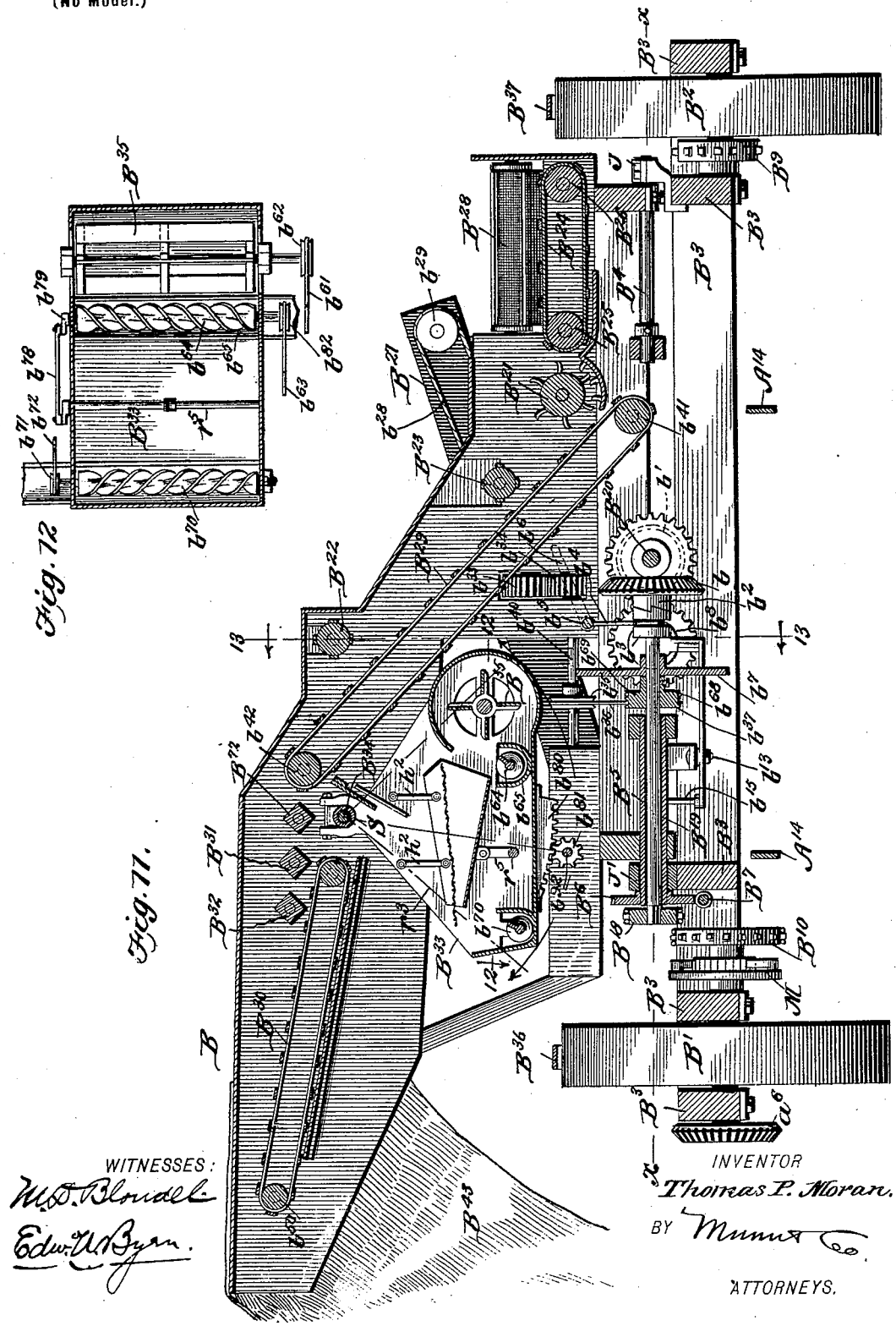
WITNESSES:
INVENTOR
Thomas P. Moran.
BY
ATTORNEYS.

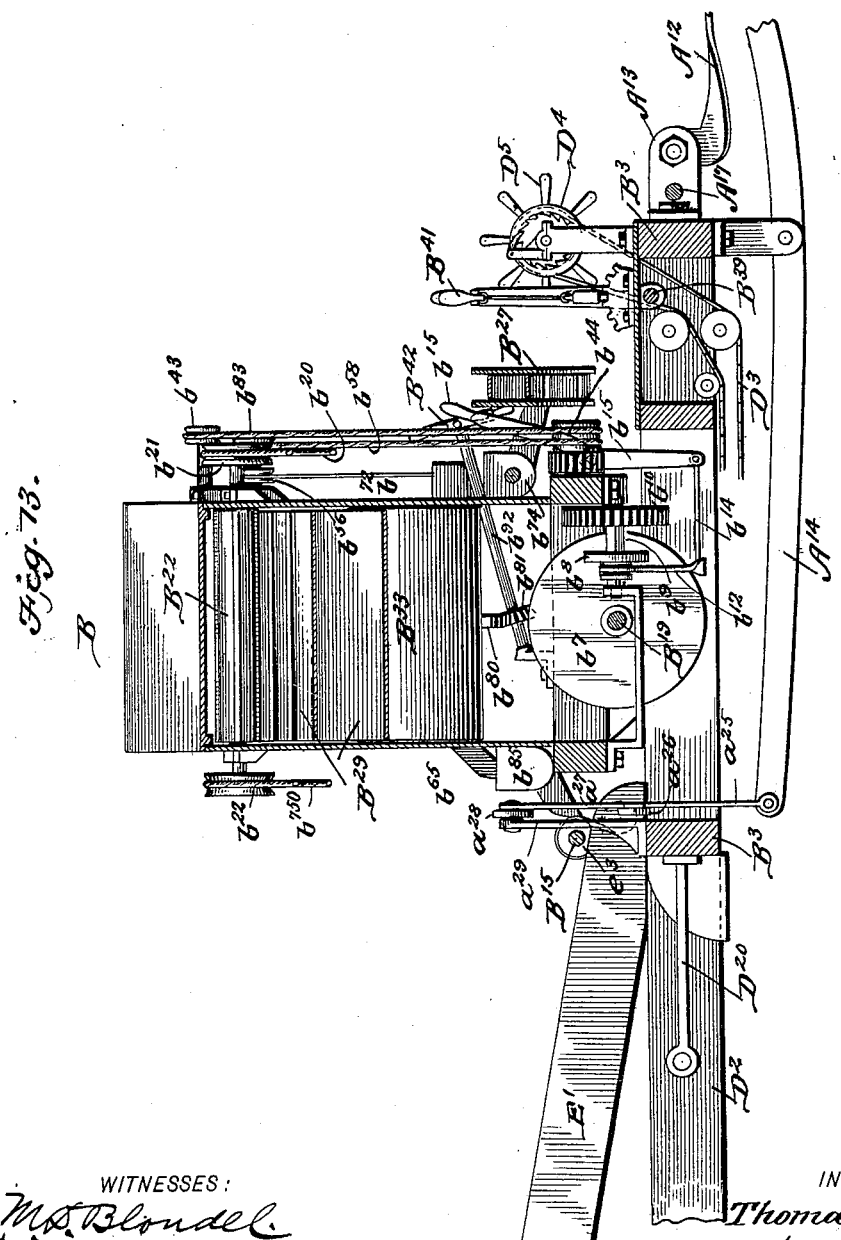

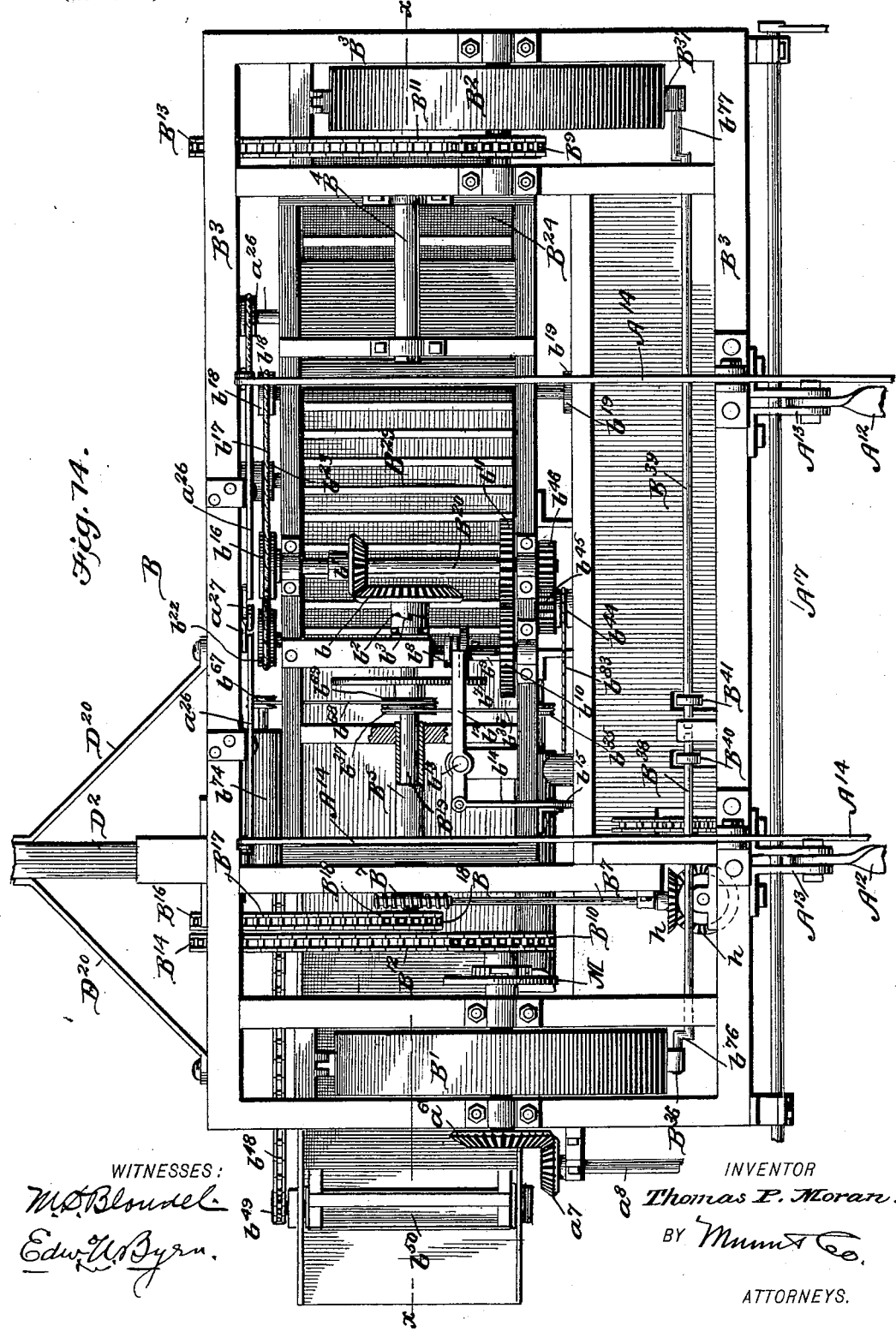

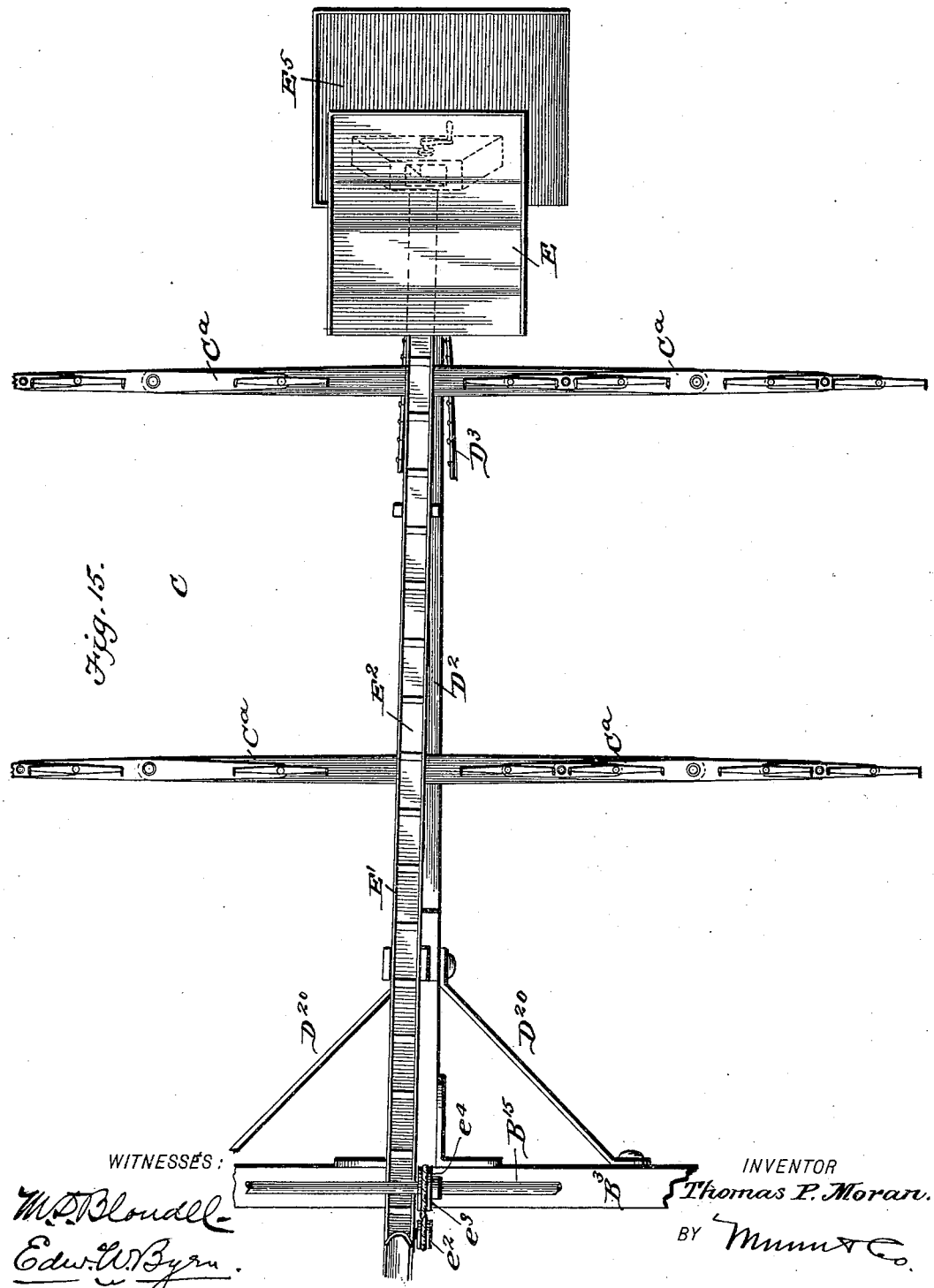

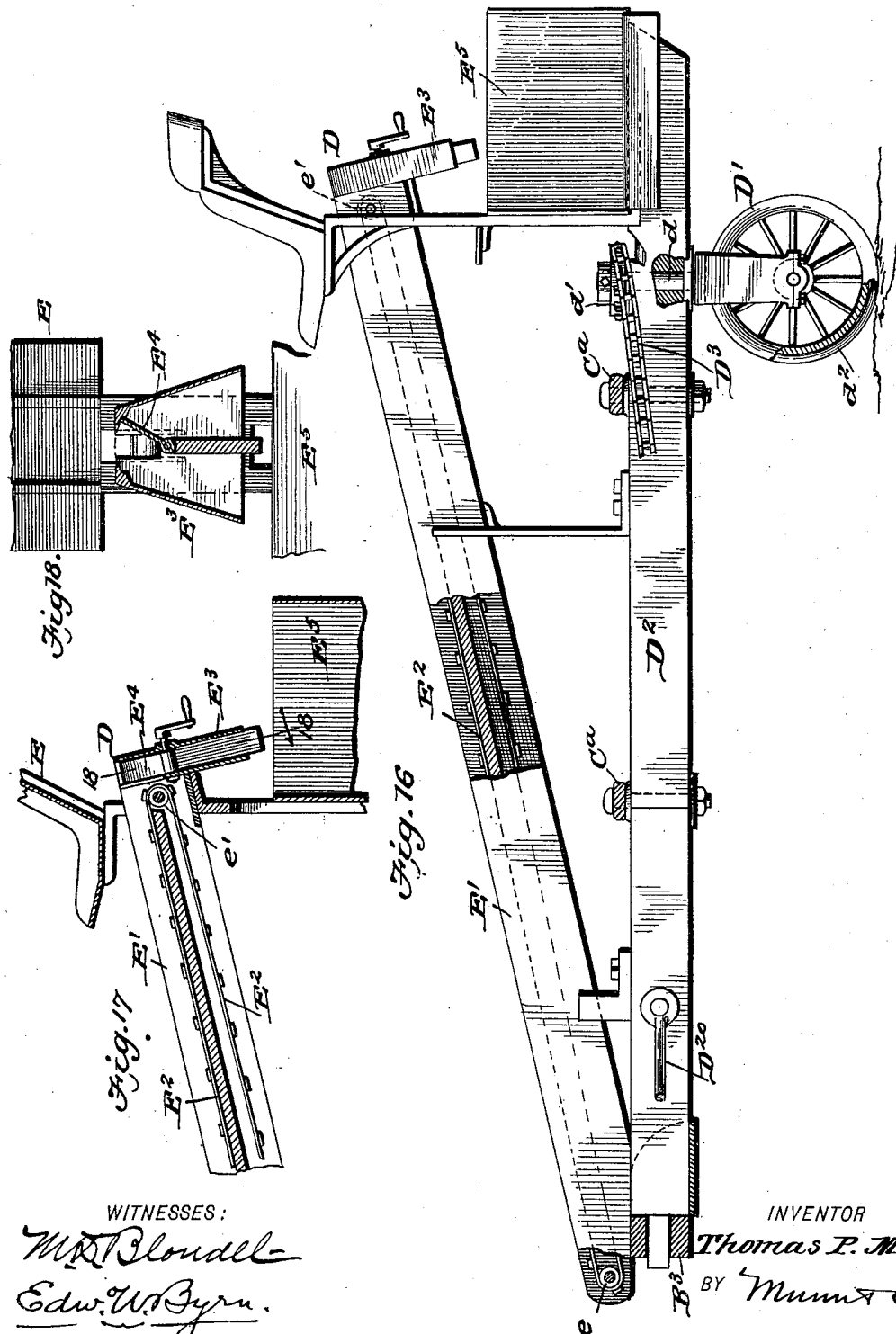

UNITED STATES PATENT OFFICE.

THOMAS P. MORAN, OF NELSON, CANADA.

COMBINED HARVESTER, THRESHER, AND BAGGER.

SPECIFICATION forming part of Letters Patent No. 640,682, dated January 2, 1900.

Application filed March 27, 1899. Serial No. 710,652. (No model.)

*To all whom it may concern:*

Be it known that I, THOMAS P. MORAN, of Nelson, British Columbia, Canada, have invented a new and useful Improvement in a Combined Harvester, Thresher, and Bagger, of which the following is a specification.

My invention relates to that form of machine which is designed to cut off the heads of the grain standing in the field and to thresh and bag the same in one operation. Such machines have heretofore been constructed which work fairly well on level ground, but have not been found practical on hilly ground. The reason for this is that when the machine would ascend a hill the cleaning or winnowing part of the machine was not level and the grain would waste over the shoe and in going downhill the grain would rush to the front part of the sieve, causing clogging or wasting of grain. Furthermore, when traveling on a hillside at right angles to the slope the machine, with its great weight, is inclined to keep sliding downhill, and with the horses in front of the machine and strung out in a row it is necessary in order to counteract the tendency to slide downhill to steer the horses into the standing grain to such an extent as sometimes to have six or eight horses trampling down the standing grain, involving a very great waste or destruction of the grain, for the reason that when trampled down the grain-heads are no longer caught and removed by the header, but are left behind.

My invention is designed to provide a combined header, thresher, and bagger that will work as well on hilly ground as on level ground, and for this purpose the header is placed in front and the thresher is placed behind the header, with its length or longitudinal axis at right angles to the line of draft, so that the thresher practically moves sidewise, and behind the thresher comes the team, while the driver's seat and bagging devices are run out to a point in rear of the team. Special provision is made by devices hereinafter described for leveling and adjusting the various parts of the machine, and the advantages of having the team in rear, as described, is that in traveling around a hillside the team is thrown away from the standing grain (instead of into it) in steering the front of the machine at a slight angle uphill in counteracting the drift or natural tendency of the machine to slide downhill.

My invention consists in the peculiar construction and arrangement of the various parts of the machine operating upon the above-described general principle, which will be hereinafter more fully described with reference to the drawings, in which—

Figure 2:
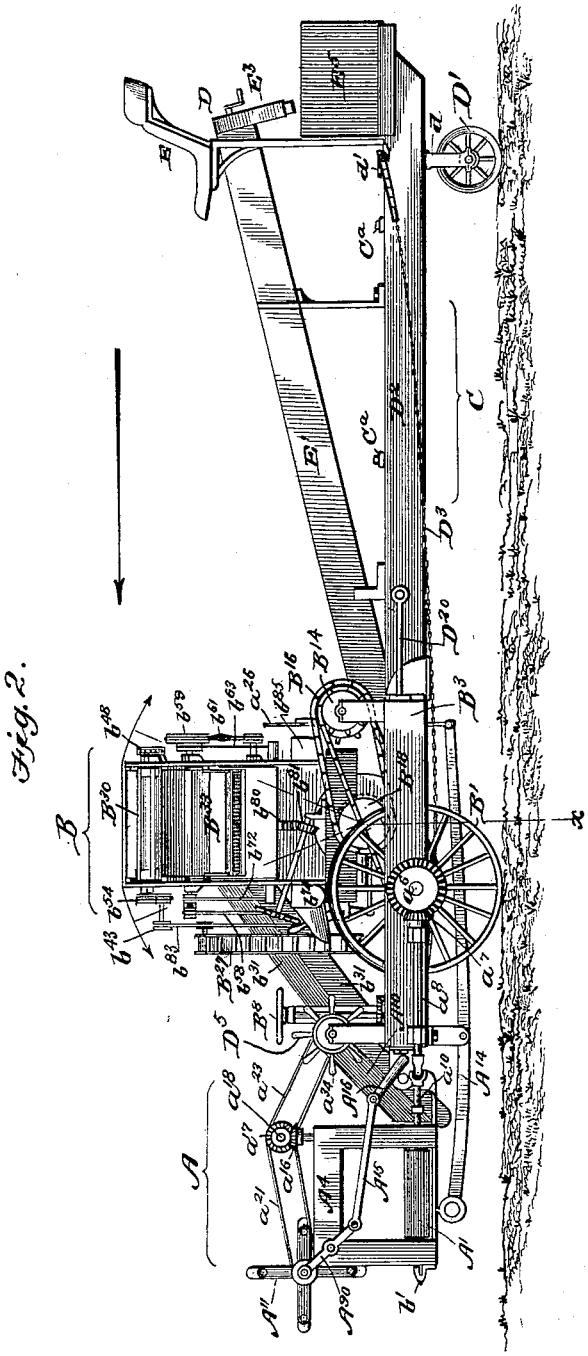
Figure 3:
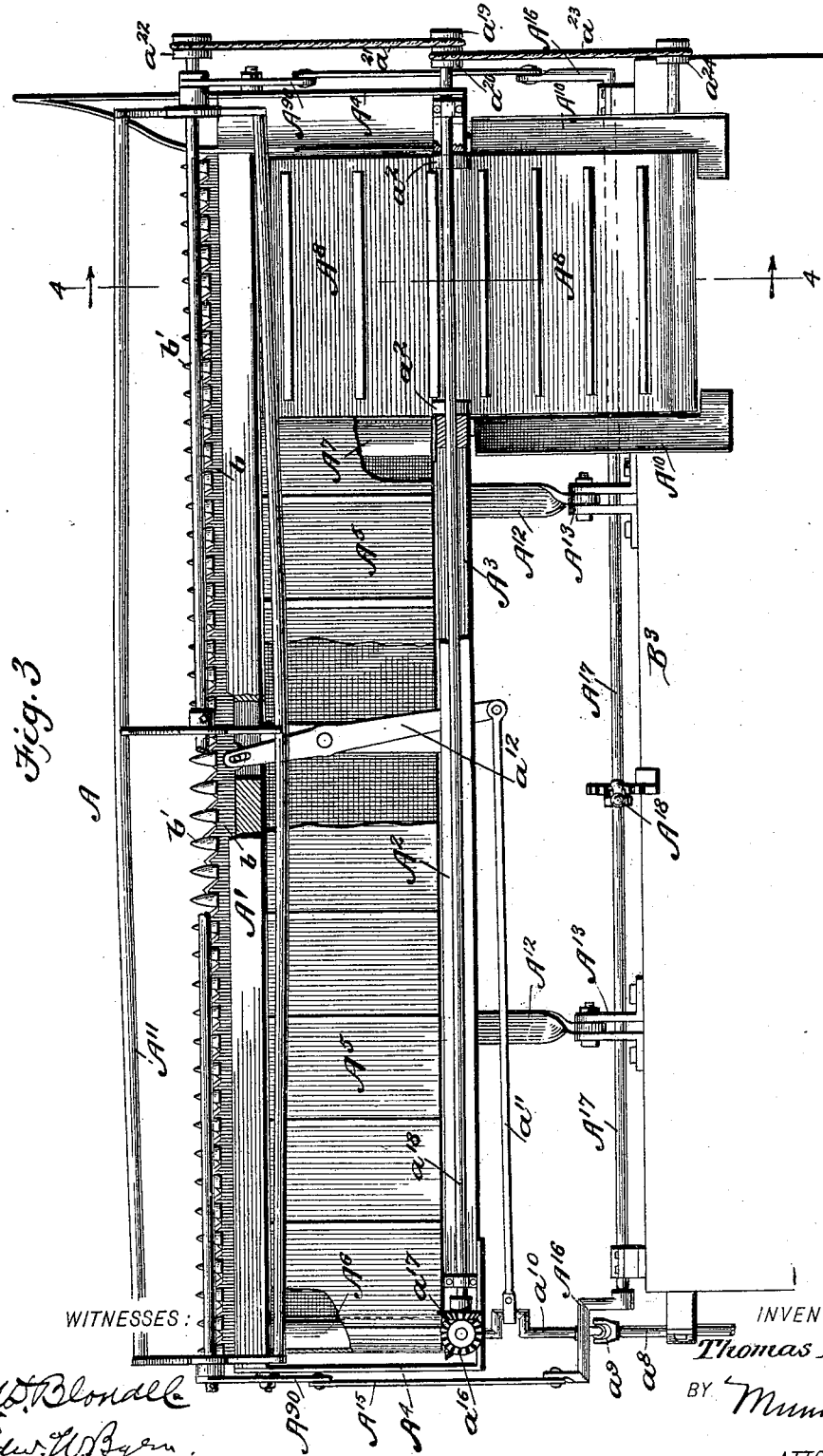
Figure 6:
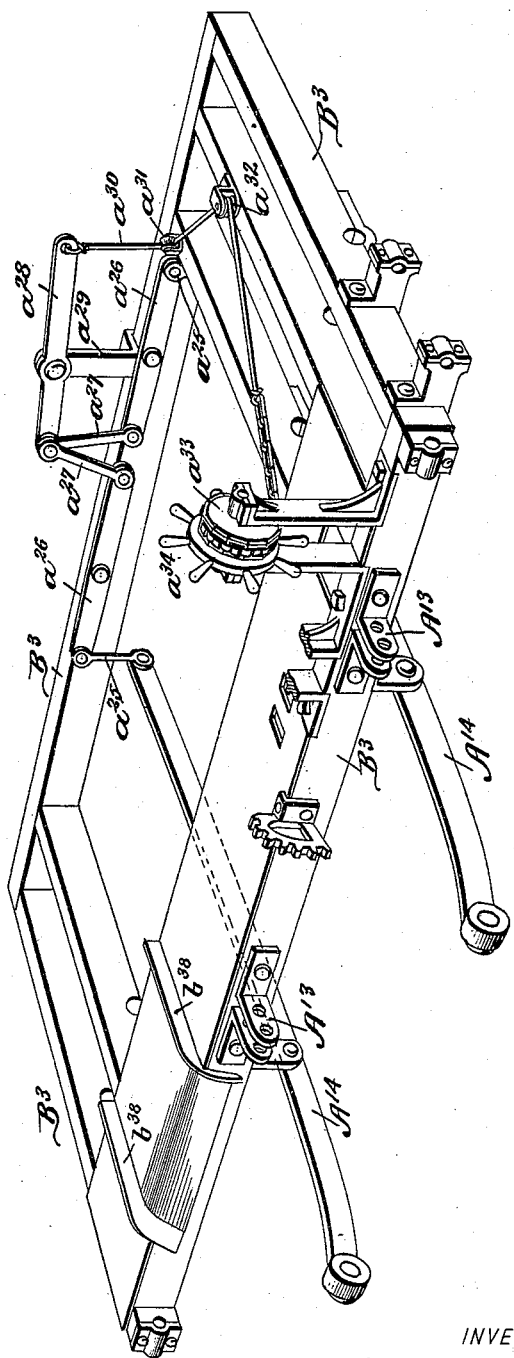

Figure 1 is a plan view of the entire machine, with the direction of its advance indicated by a large arrow. Fig. 2 is a side elevation of the same from the left-hand side of the driver. Fig. 3 is a plan view of the header mechanism, partly broken away. Fig. 4 is a vertical section on line 4 4 of Fig. 3, looking in the direction of the arrow crossing said line. Fig. 5 is a side elevation of the header mechanism from the left-hand side of Fig. 3. Fig. 6 is a perspective view of the devices for raising and lowering the header mechanism. Fig. 7 is a plan view of the threshing and cleaning devices. Fig. 8 is a vertical section on line 8 8 of Fig. 7, looking in the direction of the arrow crossing said line. Fig. 9 is a rear end elevation of the thresher, partly in section, on line 9 9 of Fig. 1. Fig. $9^a$ is a sectional detail on line $9^a\ 9^a$ of Fig. 9. Fig. 10 is a vertical section taken longitudinally to the entire machine or in the direction of advance and cutting through the parts on lines 10 10 of Figs. 1 and 9 and looking in the direction of the arrow crossing said lines. Fig. 11 is a vertical longitudinal section through the threshing and cleaning devices on line 11 11 of Fig. 7, looking in the direction of the arrow crossing said line. Fig. 12 is a horizontal section of the fanning devices, taken on line 12 12 of Fig. 11. Fig. 13 is a vertical transverse section through the thresher, taken on lines 13 13 of Figs. 7 and 11, looking in the direction of the arrows crossing these lines. Fig. 14 is an underneath plan view of the threshing devices. Fig. 15 is a plan view of the draft devices and the bagging devices at the rear end of the machine. Fig. 16 is a side elevation of the same partly broken away. Fig. 17 is a longitudinal vertical section through the bagging devices at the right-hand end of Fig. 16. Fig. 18 is a rear sectional view of the bagging devices, taken on line 18 18 of Fig. 17.

In the drawings, Figs. 1 and 2, A is the header, which cuts the heads off the grain standing in the field in a manner that is already well known. B is the thresher, placed behind the header and with its side to the front or parallel to the cutter-bar, so that the grain passes through the thresher in a direction at right angles to the line of advance. C are the draft connections for the team, consisting of a series of doubletrees and singletrees, as here shown adapted for fourteen horses, but which may be arranged for a greater or less number, depending upon the size and weight of the machine. The team attached to these singletrees is in rear of the header and thresher and faces toward the front, as seen in Fig. 1. D are the bagging devices at the rear of the machine, behind the team, and on top of which is mounted the driver's seat E. This whole machine travels upon three wheels—two main drive-wheels B' B², Figs. 1, 2, 8, 9, 11, and 14, whose planes are arranged in the line of the draft, one at the front end and the other at the discharge end of the threshing-machine, but both the same distance in rear of the header and journaled on a strong rectangular main frame B³, Fig. 6. The third supporting-wheel is shown at D', Figs. 2 and 16, at the extreme rear end of the machine, beneath the bagging appliances. This wheel is a steering-wheel and is fixed to a vertical shaft $d$, swiveling in the rear end of a strong rearwardly-projecting tongue D², which at its forward end (see Figs. 2, 13, 14, 15, and 16) is detachably connected to the rear side of the main frame B³, a little to one side of the middle line. This tongue carries the doubletrees C$^a$, Figs. 1 and 15, and is strongly braced to the main frame, and through the tongue the whole power of the team is employed to push in advance of it the header and thresher over the field, the machine being arranged to turn to the right in traveling around a field.

Having given this general idea of the construction of the entire machine, I will now proceed to describe more in detail the several leading features of the machine, beginning with the header A in front and referring more especially to Figs. 1, 2, 3, 4, 5, and 6.

The header consists of a framework, Figs. 3, 4, and 5, whose length is at right angles to the line of draft and which consists of three longitudinal bars A' A² A³ and two end frames A⁴ A⁴. The front longitudinal bar A' is the full length of the frame. The rear upper longitudinal bar A² is the full length of the frame, but the rear lower longitudinal bar A³ (see Figs. 3 and 4) stops short of the full length of the frame to permit of the application of an elevator-belt, as hereinafter described. On the front bar A' is mounted the finger-bar $b'$, in which plays a cutter-bar or knife $b$. A⁵, Figs. 1 and 3, is an endless carrier-apron which is arranged longitudinally and parallel with the cutter-bar, immediately behind the same, and serves to carry the cut-off heads of grain to the elevator to be taken to the thresher. This carrier-apron (see Fig. 3) extends around a roller A⁶ at one end of the frame and another roller A⁷ at the end of the rear lower bar A³. At the end of the rear lower bar A³ there runs at right angles to the cutter-bar an endless belt A⁸, Figs. 1, 3, and 4, whose front part runs horizontally from the cutter-bar to the line of the rear bar A³, Fig. 3, and then passes under two guide-rollers $a^2$ $a^2$ and rises at an angle of about forty-five degrees, Fig. 4, being distended around rollers $a^3$ $a^4$ $a^5$, of which $a^5$ is located at the top of rearwardly-inclined uprights A⁹, connected and braced to the frames of the header and having flanged plates A¹⁰ A¹⁰ on each side (see Fig. 3) to keep the heads of grain from falling over the edges.

In inclined arms A⁹⁰ A⁹⁰ at each end of the header there is journaled a reel A¹¹, which strikes the heads of grain and forces them over the cutter-bar and onto the carrier-apron.

All the parts of the header are driven from the left-hand wheel B', Fig. 1, of the two main drive-wheels, which run upon the ground, and motion is transmitted as follows: A bevel-gear $a^6$, Figs. 1, 2, 7, 8, and 11, on drive-wheel B' meshes with a bevel-gear $a^7$ on a shaft $a^8$, arranged in bearings outside the main frame B³. This shaft $a^8$ is connected by a knuckle or universal joint $a^9$ to a cranked shaft $a^{10}$, Figs. 3 and 5, which is rigid with one of the rollers A⁶, that distends the receiving-apron. The crank of this shaft is connected to a long pitman $a^{11}$, and this in turn is connected to a lever $a^{12}$, Fig. 3, which is fulcrumed near its middle to the under side of the header-frame and at its forward end is connected to the cutter-bar to reciprocate it whenever the machine is moved forward and the drive-wheel B' is turned, the receiving-apron $a^5$ being turned by its roller A⁶, which is rigidly connected with the same crank-shaft $a^{10}$.

To rotate the reel and the first elevator-belt, (which are connected to the header,) a bevel-gear $a^{13}$, Fig. 5, is fixed upon the crank-shaft $a^{10}$ and is made to engage with a bevel-gear $a^{14}$ on the lower end of an upright shaft $a^{15}$. This upright shaft bears on its upper end a bevel-gear $a^{16}$, which engages with a bevel-gear $a^{17}$ on the end of the long horizontal shaft $a^{18}$, which extends to the other end of the header, and there has rigidly attached to it two pulleys or a single pulley with two belt-faces $a^{19}$ $a^{20}$, Fig. 3. From one of these faces $a^{19}$ a belt $a^{21}$, Figs. 3 and 4, extends to a pulley $a^{22}$ on the end of the reel-shaft to rotate it, and from the other one of the pulley-faces $a^{20}$ another belt $a^{23}$ extends to a pulley $a^{24}$ on the end of the roller $a^5$, that distends the upper end of the elevator-belt A⁸. By means of these devices all the movable parts of the header are actuated through the main drive-wheel B' and the crank-shaft $a^{10}$.

To adapt the header to going up and down hill and to various heights of grain, its forward edge, bearing the cutter-bar, is arranged to be adjusted vertically, as follows, (see Figs. 3, 6, and 10:) To the longitudinal bars of the header-frame are securely bolted two or more rearwardly-projecting arms $A^{12}$ $A^{12}$, Figs. 3 and 10, which are jointed to forwardly-projecting brackets $A^{13}$ $A^{13}$ on the front edge of the main frame $B^3$. This joint or axis of articulation is exactly in line with the knuckle or universal joint $a^9$ in the crank-shaft $a^{10}$, so that the whole header may swing up or down about this axis to adjust its front edge to the desired elevation. To give this adjustment and to sustain the header, its weight is borne upon two rollers on the outer ends of two long horizontal arms $A^{14}$ $A^{14}$, Figs. 6 and 10, arranged longitudinally to the line of draft and fulcrumed near their middle part to hanger-bars extending downwardly from the front bar of the main frame $B^3$. At their rear ends these arms are connected by links $a^{25}$, Fig. 6, to the ends of short levers $a^{26}$, fulcrumed to the rear bar or frame $B^3$. The adjacent ends of these levers are connected by links $a^{27}$ $a^{27}$ to another lever $a^{28}$, fulcrumed on a standard $a^{29}$, mounted on the rear part of main frame $B^3$, and from the opposite end of this lever a rope or chain $a^{30}$ extends over guide-pulleys $a^{31}$ $a^{32}$ to a winding-drum $a^{33}$ on a hand-wheel $a^{34}$, mounted in standards on the platform in front of the thresher. This winding-drum has a ratchet-wheel and pawl to hold it to its adjustment, and by its means and the train of mechanism just described the outer or forward ends of the long arms $A^{14}$ $A^{14}$ are made to raise and lower and to sustain the front part of the header at any desired elevation, as shown by the dotted radius $r^2$ and arc in Fig. 10.

To adjust the reel $A^{11}$ higher or lower with reference to the cutter-bar, the inclined arms $A^{90}$, (see Figs. 3 and 5,) which carry the reel, are fulcrumed in the middle to the end frames A, and the lower ends of these arms are jointed to connecting-bars $A^{15}$ at each end, and these bars are in turn jointed to rigid arms $A^{16}$ on a rock-shaft $A^{17}$, running across the machine, (see Fig. 3,) which rock-shaft is provided with a rigid hand-lever $A^{18}$ at a suitable point near the platform in front of the thresher in convenient position for the operator to work it. By moving this hand-lever $A^{18}$ and rocking the shaft $A^{17}$, with rigid arms $A^{16}$, it will be seen that the reel $A^{11}$ may be raised or lowered at will.

I will now describe the threshing part of the apparatus shown at B in Figs. 1 and 2.

The length of the thresher, it will be understood, is disposed at right angles to the line of advance, so that the thresher moves over the ground sidewise, the feeding end of the thresher being on the side of the standing grain and the discharging end of the thresher being on the side of the cut stubble. The whole body of this thresher is arranged on its subjacent main frame $B^3$ upon a horizontal axis $x$, Figs. 10 and 11, at right angles to the line of advance, so that it may have a rocking adjustment thereon to adapt it to the change in position of the subjacent frame in going up or down hill, so that when the main frame changes from a horizontal position to an inclined one the thresher may be adjusted about its axis to compensate for the same and bring the sieves and shoe of the thresher to an exactly level or horizontal position, which is absolutely necessary for good work. This adjustment is indicated in Fig. 10 by the dotted arc $r$ and the radial lines running from its ends to the axial center $x$. It is provided for on one side of the machine (see Figs. 11 and 14) by a large and strong axle-arm $B^4$ at the lower part of the feed end of the thresher, which axle-arm rolls in a stout journal-box J, Fig. 11, on the main frame $B^3$. At the other side the axis is formed by a strong hollow shaft $B^5$, in line with the first-named axle-arm $B^4$ and at right angles to the line of draft, which hollow shaft is fixed rigidly in the lower cross-timbers of the thresher and turns or rocks in a stout journal-box J on the main frame corresponding to the one at the other end. This axle is made hollow for the definite reason that the power to operate the working parts of the thresher must be transmitted to them in a manner concentric with its rocking or leveling axis in order to avoid conflict between said transmission of power and the rocking or leveling adjustment of the thresher. To put this leveling adjustment under the control of the operator, who stands on the platform in front of the thresher at the point $y$, Fig. 1, there is rigidly attached to the end of the hollow shaft $B^5$ a worm-wheel $B^6$, Figs. 10 and 11, with which there engages a worm on a horizontal shaft $B^7$. This shaft is connected by a pair of bevel-gears $h$ $h$, Fig. 10, to a vertical shaft rising through the platform and provided with a hand-wheel $B^8$, by turning which the whole body of the thresher may be adjusted about its leveling axis $x$, causing the top of the thresher to be tipped forward or backward in the arc $r$ $r$, Fig. 10, just enough to compensate for the rise or declivity of the hillside in going up or down the same.

To operate the thresher considerable power is required, and both of the main drive-wheels $B'$ $B^2$ are used for this purpose. A sprocket-wheel $B^9$, Fig. 14, geared to main drive-wheel $B^2$, and a sprocket-wheel $B^{10}$, geared to main drive-wheel $B'$, are coupled by chain belts $B^{11}$ $B^{12}$ with rigid sprocket-wheels $B^{13}$ $B^{14}$, Fig. 7, on a long counter-shaft $B^{15}$, running nearly the full width of the machine and journaled in bearings on the main frame $B^3$. This shaft near one end has a rigid sprocket-wheel $B^{16}$, connected by a chain belt $B^{17}$, Fig. 10, with a sprocket-wheel $B^{18}$ on a central main drive-shaft $B^{19}$, Fig. 11, which main drive-shaft is arranged longitudinally through the hollow rocking or leveling shaft $B^5$. This shaft $B^{19}$ operates all the parts of the thresher. Between the sprocket-wheel $B^{10}$ and its running or driving wheel B', Figs. 11 and 14, there is the usual ratchet-and-pawl mechanism M to allow the running-wheels B' B² to have an independent action in turning. From the shaft B¹⁹ the power is distributed to the rest of the machinery of the thresher, as follows: On the inner end of the drive-shaft B¹⁹ there is a loose bevel-gear $b$, Figs. 11 and 14, meshing with a tight bevel-gear $b'$ on a cross-shaft B²⁰. The loose bevel-gear $b$ has a clutch-face $b^2$ on one side adjacent to a sliding clutch-collar $b^3$, which is secured on the shaft B¹⁹, so as to slide freely thereon, but to turn rigidly with it. This collar is arranged to be adjusted on shaft B¹⁹ by forked arm $b^4$, Fig. 11, on a rock-shaft $b^5$, which latter has a hand-lever $b^6$, extending up through the platform of the thresher, so that when the clutch-collar is engaged with the clutch of bevel-gear $b$ the rotation of shaft B¹⁹ turns cross-shaft B²⁰ and the various parts of the thresher; but when said clutch-sections are disengaged the bevel-gear $b$ is loose and the transmission of power is interrupted. To vary the speed of the thresher, as is desirable in going up or down hill, I provide a friction-gear, Figs. 11, 13, and 14, consisting of a rigid disk $b^7$, fixed on the main shaft B¹⁹, and a friction-wheel $b^8$, sliding across the face of said disk. This friction-wheel $b^8$ slides longitudinally on a short square shaft $b^9$, but turns it when rotated. This shaft $b^9$ has a rigid gear-wheel $b^{10}$, meshing with another rigid gear-wheel $b^{11}$ on the cross-shaft B²⁰. Now when the clutch connection between shafts B¹⁹ and B²⁰ is broken power is transmitted from shaft B¹⁹ to B²⁰ through this friction-gear, which is variable in speed, by adjusting the friction-wheel $b^8$ closer to or farther from the center of disk $b^7$, from which it derives its motion. To adjust this friction-wheel, it is carried in the upturned and forked end of a horizontal lever $b^{12}$, Fig. 13, fulcrumed at $b^{13}$, Fig. 14, to a stirrup depending from the framework and having its other end connected by a link $b^{14}$, Figs. 13 and 14, with a hand-lever $b^{15}$, Figs. 8 and 10, projecting up above the platform beside the thresher. When the clutch-faces $b^2\ b^3$ are in engagement, the friction-wheel $b^8$ is out of engagement with disk $b^7$, and vice versa.

I will now trace and describe the different trains of mechanism from shafts B¹⁹ and B²⁰ to the various driven parts of the thresher.

On one end of cross-shaft B²⁰, Figs. 14 and 19, is a pulley $b^{16}$, connected by a belt $b^{17}$ with a pulley $b^{18}$ on the end of the threshing-cylinder B²¹, Figs. 9 and 11. This threshing-cylinder has on its opposite end a pulley $b^{19}$, Figs. 8 and 14, connected by a belt $b^{20}$ with another pulley $b^{21}$ on the end of a revolving beater B²², Figs. 11 and 13. This beater has on its other end a pulley $b^{22}$, Fig. 9, connected by a belt $b^{750}$ with a pulley $b^{23}$ on the end of a second and lower beater B²³, Figs. 7 and 11. This beater has besides its pulley $b^{23}$, Figs. 7, 9, and 11, a second pulley $b^{24}$, connected by a crossed belt $b^{25}$ with a pulley $b^{26}$ on the end of a roller B²⁵, distending the short feeder-apron B²⁴, stretched between rollers B²⁵ and B²⁶, Fig. 11, and arranged directly in front of and rotating in line with the cylinder. On the opposite end of the beater B²³, Fig. 7, there is a pulley $b^{27}$, which by a belt $b^{28}$ turns a pulley $b^{29}$ on a short roller at the upper end of the tailings-elevator B²⁷. This latter is an inclined trough having within it an endless belt with cups or flights on it, which runs from the rear end of the thresher, as hereinafter described, and receives the tailings or unthreshed heads of the wheat that fall from the sieves and carries them back through the threshing-cylinder again. For this purpose this tailings-elevator discharges upon the upper section B²⁸, Figs. 1 and 7, of the main elevator-apron, which is arranged to move at right angles to the thresher and in line with the lower elevator-apron A⁸, carried on the header. This lower elevator-apron on the header carries the grain-heads up to and deposits them upon the upper elevator-apron B²⁸, and the latter carries up the wheat-heads (and the tailings from the tailings-elevator) and deposits them upon the short feeder-apron B²⁴, which travels at right angles to the elevator-aprons and feeds the grain-heads and tailings straight into the threshing-cylinder. The upper section B²⁸ of the elevator (see Figs. 4 and 7) is distended between a roller $b^{39}$ at the bottom and a driven roller $b^{30}$ at the top within an inclined frame having flanges or wings $b^{31}\ b^{31}$ on its sides to keep the grain-heads from jolting off. The drive-roller $b^{30}$ at the top of the elevator-apron B²⁸ is fixed on a shaft $b^{32}$, Fig. 7, running parallel with the side of the thresher and having on its rear end a small gear-wheel $b^{33}$, meshing (see Fig. 8) with another gear-wheel $b^{34}$ on a second lower shaft $b^{40}$, extending farther back toward the rear end of the thresher and having a pulley $b^{35}$, which by a belt $b^{36}$ connects (see Figs. 11 and 14) with a twin pulley $b^{37}$ on the main drive-shaft B¹⁹ under the thresher. This part B²⁸ of the elevator, it will be seen, is driven directly from the main shaft, and its frame (see Fig. 4) is loose at its lower end and moves about the axis of its upper roller as a hinge, so that said elevator can adjust itself automatically on the edge of the platform to accommodate the rocking or leveling movement of the thresher about axle-arm B⁴, (axis $x$.) Where the elevator-frame rests upon the platform, the latter is adapted to hold it against displacement by a seat or chute-like formation $b^{38}$, having flanged sides between which the lower end of this elevator-frame rests and moves up or down as the thresher tilts.

B²⁹, Figs. 7 and 11, is an elevator-apron which runs from a pulley $b^{41}$ below the threshing-cylinder to another one $b^{42}$ in the upper part of the thresher. This apron is to carry the threshed grain, straw, and chaff away from the threshing-cylinder, and it is driven from the upper roller $b^{42}$, Figs. 7 and 8, by a pulley $b^{43}$ on one end and a belt $b^{83}$, Figs. 8 and 14, extending downwardly to a double pulley $b^{44}$, Fig. 14, on the side of a gear-wheel $b^{45}$, that meshes with a gear-wheel $b^{46}$ on the end of the cross-shaft $B^{20}$ under the thresher. This roller $b^{42}$, Fig. 11, at the upper end of the straw-apron $B^{29}$ has on the opposite end from its driving-pulley a sprocket-wheel $b^{47}$, Figs. 7 and 9, which by means of a long horizontal chain belt $b^{48}$ connects with a sprocket-wheel $b^{49}$ on a rear roller $b^{50}$, Figs. 7 and 11, that distends the slatted straw-carrier belt $B^{30}$. This same chain belt $b^{48}$ (see Fig. 9) in its passage to the rear touches and rotates the two sprocket-wheels $b^{51}$ $b^{52}$ on the ends of the beater-rollers $B^{31}$ $B^{32}$, Fig. 11, and one of these has a pulley $b^{53}$, Figs. 7 and 8, on its end, that is connected by a belt $b^{54}$ to a pulley $b^{55}$ on the end of a third beater-roll $B^{72}$.

Beneath the upper end of the elevator-apron coming from the threshing-cylinder there is arranged the fanning device for separating the grain from the chaff. This whole device is contained within an independent casing $B^{33}$, Figs. 10, 11, 12, and 13, which is suspended from a point above in such a way that it may swing back and forth about radial line $r^3$, Fig. 11, from front to rear of the thresher and always maintain automatically an exactly level or horizontal position, so that in traveling around a hillside the grain will not be thrown over the ends of the sieves or shoe, but the level of the sieves will always be maintained automatically, irrespective of the position of the main frame and running-wheels of the thresher. This casing $B^{33}$ is suspended upon a hollow shaft S, Figs. 11 and $9^a$, in the main casing of the thresher and has a concentric internal driving-shaft $B^{34}$, which drives all the parts of the fanning devices. This drive-shaft for the fanning devices, Fig. $9^a$, has on one end two pulleys $b^{56}$ $b^{57}$ side by side. One of them, $b^{56}$, is connected by a belt $b^{58}$, Fig. 8, to the double pulley $b^{44}$ and receives its motion through the same gear-wheels $b^{45}$ $b^{46}$ and cross-shaft $B^{20}$ which run the elevator-apron for the straw, chaff, and grain.

On the opposite end of the main drive-shaft for the winnowing devices there is fixed a double pulley $b^{59}$ $b^{60}$, Figs. 7, 9, and $9^a$. The larger of these, $b^{59}$, is connected by a crossed belt $b^{61}$ with a pulley $b^{62}$ on the shaft of the rotary fan $B^{35}$, Figs. 11 and 12. The other one, $b^{60}$, Fig. 9, is connected by a belt $b^{63}$ with a small pulley $b^{82}$ on the end of a screw conveyer $b^{64}$, Fig. 12, working in a trough $b^{65}$, transversely to the thresher and at the bottom of the swinging fan-casing. This serves to discharge the cleaned grain into a longitudinally-arranged trough $b^{85}$, Figs. 9, 10, and 13, on the rear side of the thresher, in which trough revolves a second screw conveyer $b^{66}$, Fig. 9, turned by a pulley $b^{67}$, connected by belt $b^{68}$, Fig. 14, to twin section $b^{69}$ of pulley $b^{37}$ on the main longitudinal drive-shaft $B^{19}$, Fig. 14, under the thresher. This trough $b^{85}$ has a spout discharging into a long grain-elevator, (seen in Figs. 15 and 16 and hereinafter described,) which carries the clean grain back to the extreme rear end of the machine, where it is put in sacks or bags. At the end of the swinging shoe or fan-casing there is a transverse trough, with a screw conveyer $b^{70}$, Figs. $9^a$, 11, and 12, bearing a pulley $b^{71}$, which is connected by a belt $b^{72}$, Fig. 8, to a pulley $b^{57}$ on a drive-shaft, about whose center the fanning devices are hung. This screw conveyer transfers the tailings from the sieves to a subjacent trough $b^{74}$, Fig. 8, running parallel with the side of the thresher, in which a spiral conveyer-blade $b^{75}$, fixed on the shaft $b^{40}$, turns and transfers the tailings to the lower end of the tailings-elevator $B^{27}$, Figs. 10 and 7, which receives and puts them through the thresher a second time, as already described. The sieves or screens of the fan are arranged in the shoe, which is mounted on hangers $h^2$ $h^2$, Fig. 11, in the ordinary manner, and are shaken by rock-shaft $r^5$ through a rod $b^{78}$, Fig. 12, and crank $b^{79}$ on the grain-conveyer shaft.

From this description it will be seen that all the mechanism on the rear part of the thresher is driven direct from the main drive-shaft under the thresher and not from the threshing-cylinder. This relieves the threshing-cylinder of a great deal of friction, strain, and wear.

To hold the machine back in going downhill, I provide for each of the running-wheels B' $B^2$ a metal strap-brake $B^{36}$ and $B^{37}$, Figs. 1, 7, 9, 11, and 14. These straps are fastened to the main frame $B^3$ in rear of the wheels, Figs. 1 and 9, and then pass over the tops of the wheel for nearly half their circumference, Fig. 7, and on the front side they are attached to crank-arms $b^{76}$ $b^{77}$, Fig. 14, on two horizontal rock-shafts $B^{38}$ $B^{39}$, which are respectively provided with hand-levers $B^{40}$ $B^{41}$, Fig. 7, projecting up through the platform in front of the thresher. By manipulating one or the other of the brakes the machine may also be guided by causing it to be held back on one side.

Sometimes it is desirable to hold the fan or winnowing device stiffly, so that it cannot swing about its hollow supporting-shaft—as, for instance, in traveling over very rough or "rutty" ground. For this purpose there is secured to the bottom of the suspended casing a set of teeth $b^{80}$, Figs. 11 and 13, curved to correspond to the center of oscillation above, and with this there is engaged a cog-wheel $b^{81}$ on a shaft $b^{92}$, Fig. 13, extending out to the side of the thresher and bearing a hand-wheel $B^{42}$. By seizing this wheel $B^{42}$ the swinging winnowing devices may be held stationary or may be adjusted at will to any desired position and there held without swinging. Ordinarily, however, the curved teeth move freely over the cog-wheel as the casing swings in automatically adjusting itself to a level position for the sieves.

At the discharge end of the thresher, where the straw and dust are blown out, there is a canvas chute B⁴³, Figs. 1 and 11, which extends to the ground or as close as possible not to drag. This is for the purpose of discharging the straw and chaff down low and to prevent it from blowing into the faces of the horses and driver, who are in rear of the discharge end of the thresher.

I will now describe the draft connections for the team and the steering and bagging devices, which are in rear of the thresher, referring especially to Figs. 1, 2, 15, and 16.

D² is a stout and long tongue projecting rearwardly from the main frame B³ and connected to it in a strong manner by braces D²⁰ D²⁰ and bolts. This tongue is rigidly connected to the main frame B³ and at its rear end is sustained upon the supporting and steering wheel D', Figs. 2 and 16, which, as before stated, is journaled in the lower branched ends of a vertical shaft $d$. This shaft has a sprocket-wheel $d'$ on its upper end, with which engages an endless chain D³, that runs under the machine to a windlass or drum D⁴, Figs. 2 and 10, on the platform in front of the thresher. This windlass has a hand-wheel D⁵, with ratchet and pawl, by which the chain belt may be turned in one direction or the other to turn the rear steering-wheel about its vertical axis, and thus turn the whole machine. In order to render the steering-wheel more effective or to prevent it from slipping sidewise on the ground, its circumference is provided with flanges $d²$, Fig. 16, that cut into the ground.

The doubletrees Cᵃ, with a sufficient number of singletrees, are pivotally connected to the tongue, so as to allow the horses to pull in two rows of seven each, as seen in Fig. 1.

Mounted on the tongue in inclined position and rising to the rear is a long grain-trough E', Fig. 16, with an endless elevator-belt E² running in it from a roller $e$ in front to another $e'$ at its rear end. This elevator-belt is driven by a pulley $e²$, Fig. 15, on its lower roller, which is connected by a belt $e³$ to a pulley $e⁴$ on the long drive-shaft B¹⁵, Figs. 15 and 9, which takes the motion of the drive-wheels to the machine. On the upper end of the trough is mounted the driver's seat E, and just behind it is a two-way chute E³, Figs. 16, 17, and 18, with a valve E⁴, which may be adjusted to deflect the stream of grain raised by the elevator-belt first into one chute and then into the other, the object being to have the grain pass into a bag beneath one chute while the filled bag under the other chute is being tied or sewed up. On the extreme rear end of the tongue, behind and below the bagging-chute, there is constructed a boxed or inclosed platform E⁵, in which stands the operator who attends to the bagging of the grain.

In constructing the mechanical parts of my machine I shall in building full-size machines make use of a more perfect and workmanlike construction in detail than is here shown in the drawings. Thus, for instance, the main drive-wheels will have cast-iron hubs, steel spokes, and wrought-iron rims and will be about five feet in diameter, with broad treads about eighteen inches wide. The main frame and the rear tongue will be of angle-iron, suitably braced and stiffened by truss-rods, so as to give the greatest strength and lightness; but these and various other details in the domain of the skilled mechanic do not form any part of my invention and need not be further described.

With my improved machine the conditions of harvesting, threshing, and bagging grain on hilly ground are fully provided for. The header in front cuts off the heads of the grain. The receiving-apron in rear of the cutter-bar feeds it to the elevator, one part of which is attached to and moves with the header, and the other part of which is attached to and moves with the thresher. The feeder-apron feeds it to the thresher, which thresher cleans and then sends the grain back to the bagging devices, all in one operation. In going up or down hill the operator levels the thresher forward or backward, as may be required, to preserve the level of the threshing devices, and in going around a side-hill the cleaning or fanning devices level themselves by swinging in automatic adjustment to a position which always maintains the sieves horizontal, thus insuring the perfect operation of these devices and preventing all waste of grain. Furthermore, by the general organization of the machine with the team in rear of the thresher it will be seen that in keeping the machine up to the grain on a side-hill the horses are thrown away from the standing grain, and the tramping down of the latter and its consequent loss is avoided.

I am aware that it is not broadly new to place a pushing-tongue behind a combined harvester and thresher and do not claim this broadly.

Having thus described my invention, what I claim as new, and desire to secure by Letters Patent, is—

1. A combined harvester and thresher, having a cutter-bar in front, and the threshing devices behind it and parallel thereto, the whole of the threshing and fanning devices being arranged to rock in a main frame about an axis longitudinal to the thresher, and its fanning devices arranged to rock within the thresher about a transverse axis, substantially as and for the purpose described.

2. A combined harvester and thresher having a cutter-bar in front, and the threshing device behind it parallel thereto; the whole of the threshing and fanning devices being mounted upon and arranged to rock in bearings on top of a main frame about an axis longitudinal to the thresher and its fanning devices suspended within the thresher to rock about an axis transverse to the thresher and means for driving the parts of both, said means being arranged concentrically with their axes substantially as and for the purpose described.

3. A combined harvester and thresher having a cutter-bar in front and a main frame mounted upon running and driving wheels, and its entire threshing devices mounted laterally to the line of draft upon said main frame on a rocking axis, separate from that of the running-wheels, and arranged longitudinally to the thresher parallel to the cutter-bar, and a driving-shaft for connecting the driving-wheels with the driven parts of the rocking thresher said driving-shaft being arranged concentrically with the rocking axis, substantially as and for the purpose described.

4. A combined harvester and thresher having a cutter-bar in front, and a main frame mounted on running and driving wheels, threshing devices arranged laterally to the line of draft upon the main frame to rock in bearings about an axis longitudinal to the thresher, a longitudinally-arranged hollow shaft fixed to the thresher concentrically with its rocking axis, means for rocking said hollow shaft and a concentric drive-shaft passing through said hollow shaft and connected respectively to the driving-wheels and the driven parts of the thresher substantially as described.

5. A combined harvester and thresher, having a cutter-bar in front, and a main frame mounted on running and driving wheels, threshing devices arranged upon the main frame to rock in bearings about an axis longitudinal to the thresher, a longitudinally-arranged hollow shaft fixed to the thresher concentrically with the rocking axis, means for rocking said hollow shaft, and a concentric drive-shaft passing through said hollow shaft and connected respectively to the driving-wheels and the driven parts of the thresher a fanning device arranged in the thresher to rock about an axis transverse to the thresher and driving mechanism for the same arranged concentrically to its rocking axis substantially as described.

6. In a harvester and thresher, the combination of a main frame, a harvester hinged thereto in front and having in rear of its cutter-bar a single parallel carrying-apron extending to near one end of the cutter-bar, a thresher arranged with its longitudinal axis parallel to the cutter-bar and mounted to rock about an axis parallel to the cutter-bar, and an elevator whose transverse dimension extends from the extreme end of the single cutter-bar apron to the extreme end of the cutter-bar, said elevator being made in two sections the lower section attached to the harvester, and the upper one attached to the thresher and moving with the thresher under said lower elevator-section as the thresher rocks, substantially as and for the purpose described.

7. In a harvester and thresher, the combination of a main frame, a harvester hinged thereto in front and having in rear of its cutter-bar a single parallel carrying-apron stopping short of, or of less length than the cutter-bar, an elevator-apron at right angles to the carrying-apron and extending transversely from the end of the carrying-apron to the end of the cutter-bar and thence horizontally back to the rear edge of the carrying-apron, and then obliquely upward, a thresher arranged parallel to the cutter-bar upon a rocking axis also parallel to the cutter-bar and a second elevator-section attached at its upper end to the thresher and underlapping the lower elevator-section, and moving with the thresher as it rocks substantially as and for the purpose described.

8. In a combined harvester and thresher, the combination with the main frame of the thresher; of two horizontal subjacent arms arranged in the line of draft, fulcrumed at their middle parts to the front edge of the thresher-frame and projecting forwardly from this point and bearing rollers at their extreme front ends, means for working the arms located at their rear ends and a harvester-frame hinged to the front side of the thresher-frame and supported and moving freely upon the rollers on the ends of the arms substantially as and for the purpose described.

9. A combined harvester and thresher having a cutter-bar in front, a threshing and fanning device parallel with and behind the cutter-bar, a pushing-tongue behind the thresher, and a grain-carrier mounted on said tongue and extending to the rear end of the same, and there provided with bagging devices, substantially as and for the purpose described.

10. A combined harvester and thresher having a cutter-bar in front, a threshing and fanning device parallel with and behind the cutter-bar, a pushing-tongue behind the thresher mounted at the rear end on a supporting and guiding wheel, an inclined elevator-trough and belt mounted on said tongue and extending above it to the rear end of the same and provided with bagging devices, a driver's seat mounted above it, and a bagger's platform arranged below it, substantially as and for the purpose described.

11. In a combined harvester and thresher, the combination with a pair of supporting and driving wheels, and a main frame mounted thereon; of a harvester mechanism hinged to the front of said frame, a thresher mounted on an axis on said frame at right angles to the line of advance, and parallel with the harvester, one end of said axis being formed as a hollow shaft rigidly connected to the thresher-body and provided with means for rocking it, a concentric drive-shaft for the thresher devices passing through said hollow shaft and connected at one end to the supporting and driving wheels and at the other end connecting with the driven parts of the thresher as described.

12. In a combined harvester and thresher, the combination with a pair of supporting and driving wheels, and a main frame mounted thereon; of a harvester mechanism hinged to the front of said frame, a thresher mounted on an axis on said frame at right angles to the line of advance, one end of said axis being formed as a hollow shaft rigidly connected to the thresher-body and provided with a worm-wheel, worm-gear, and adjusting-shaft, a concentric drive-shaft for the thresher devices passing through said hollow shaft and connected at one end to the driven parts of the thresher, and at the other end having a sprocket-wheel and chain belt, a counter-shaft arranged parallel to the thresher and sprocket wheels and chains connecting this counter-shaft to the driving and supporting wheels, substantially as and for the purpose described.

13. In a combined harvester and thresher the combination with the harvester mechanism and the threshing mechanism; arranged parallel to the cutter-bar of the harvester on a longitudinal rocking axis of the fanning devices all contained within a single suspended and swinging framework within the thresher upon an axis at right angles to the thresher, and a drive-shaft for the fan devices arranged concentric with its swinging axis and connected with the driven parts of the fan, and the driving devices of the thresher, substantially as and for the purpose described.

14. In a combined harvester and thresher, the combination with the harvester mechanism; of a thresher arranged on a rocking axis at right angles to the line of advance and parallel to its length and a freely-swinging and suspended framework arranged within the thresher upon a transverse axis and carrying the fan, its sieves, and conveyers, and a driving-shaft for the fan devices arranged concentric with its swinging axis and connected both to the driven parts of the fan and the driving parts of the thresher, substantially as and for the purpose described.

15. In a combined harvester and thresher, the combination with the harvester mechanism; of the thresher arranged on a rocking axis at right angles to the line of advance and parallel to its length; a freely-swinging and suspended framework arranged within the thresher upon a transverse axis and carrying the fan, its sieves, and conveyers; and a drive-shaft for the fan devices arranged concentric with its swinging axis, and connected both to the driven parts of the fan and the driving parts of the thresher, and means for arresting the swinging motion of the fan devices when traveling on rutty ground, as and for the purpose described.

THOMAS P. MORAN.

Witnesses:
EDWD. W. BYRN,
F. S. STITT.